April 8, 1952     J. S. THOMPSON     2,592,521
BONDED ASBESTOS AND METHOD OF MAKING THE SAME
Filed Sept. 18, 1945
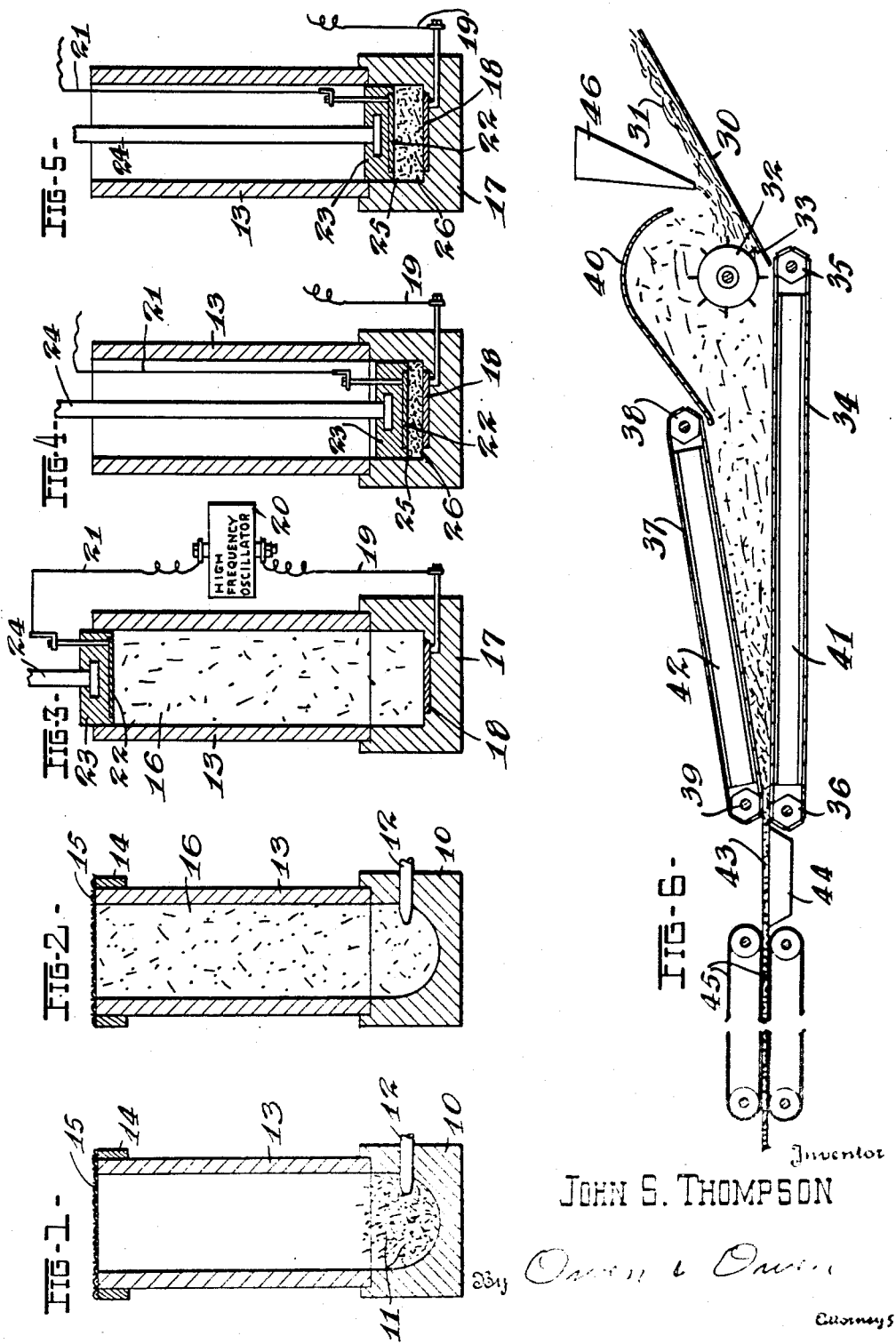
Inventor
JOHN S. THOMPSON Patented Apr. 8, 1952

2,592,521

UNITED STATES PATENT OFFICE 2,592,521

BONDED ASBESTOS AND METHOD OF MAKING THE SAME

John S. Thompson, Detroit, Mich., assignor, by mesne assignments, to Parker Rust-Proof Company, a corporation of Michigan Application September 18, 1945, Serial No. 617,104

2 Claims. (Cl. 106—286)

1

This invention relates to bonding fibrous material with a dry thermo-setting material, preferably a phosphate bonding material, preferably powder. More particularly the invention relates to a bonding of fibrous material such as asbestos, mineral wool, glass wool, or the like, which is resistant to heat, by means of a phosphate bond likewise resistant to heat. Another object of the invention is to produce a bonded material of the type described which may have any desired degree of porosity within very wide limits. Another object of the invention is to provide a bonding powder which may be readily mixed with the fibrous material. Another object of the invention is to provide means and a method for thoroughly mixing the powdered bonding material with the fibrous material to be bonded. Another object of the invention is to provide means and a method for bonding the mixture of fibrous material and powder and setting it in the desired condition of porosity. Other objects and details of the invention will appear as the description proceeds.

My prior application for Molded Articles and Method of Making the Same, filed June 1, 1944, Serial No. 538,327, now abandoned, discloses some of the subject matter disclosed herein.

In the accompanying drawings forming a part of this specification, Fig. 1 is a cross-section of mixing apparatus for blending the fibrous material and the powder.

Fig. 2 is a similar cross-section showing the mixed material therein.

Fig. 3 is a cross section of one form of apparatus for compressing the mixed material and setting it in the desired article.

Fig. 4 and Fig. 5 are cross-sections similar to Fig. 3, but showing the apparatus in different stages of the operation.

Fig. 6 is a diagrammatical illustration of alternative apparatus for mixing and compressing the material to the desired degree.

In the apparatus shown in Fig. 1 there is a bowl 10 in which a desired quantity 11 of asbestos or the like may be placed with the desired amount of bonding powder accompanying it. As a usual thing the full amount of bonding powder necessary for producing the desired article can be dumped into the bowl along with the asbestos. An air jet nozzle 12 is provided for injecting air under pressure into the bowl. Above the bowl there is a cylinder 13. Over the top of the cylinder there is a ring 14 to which is attached a screen 15.

The operation of this portion of the apparatus is as follows:

2

After the asbestos and bonding powder have been placed in the bowl, the cylinder 13 is placed in position with the cover thereover. Then nozzle 12 is inserted and air injected into the bowl. This results in agitating the asbestos and powder so that the material is fluffed up until it may fill the cylinder, as indicated at 16 in Fig. 2. At the same time the powder is distributed evenly over the fibers of the asbestos or other fibrous material.

If for any reason more bonding powder is desired than will readily cling to the fibers when blown or fluffed up as just described, the amount that will so cling may be applied as a first step and then the fluffed material may be dried or treated so that the powder will be more firmly attached to the fibers. Then an additional amount of bonding material can be mixed with the fibrous material. This process may be repeated as many times as necessary to produce an article having as much bonding material as desired in proportion to the fibrous material. For most purposes, however, it has been found that the bonding powder necessary can be mixed with the fiber in one operation.

After the material has been thus mixed and fluffed, the screen 15, which is provided for permitting escape of air while retaining the material, may be removed and the cylinder with the material therein placed on a mold 17 as indicated in Figures 3, 4 and 5. Of course, where desired the material may be mixed and fluffed in a relatively large container and only a portion of this employed for forming a single article, but for simplification the drawings illustrate the use for compressing the material of the same container in which it is fluffed.

In the apparatus shown in the drawings, the bottom of mold 17 is provided with a conducting plate 18 which is attached by a lead wire 19 to one pole of a high frequency oscillator 20. The other pole of the oscillator is connected by a lead wire 21 to a plate 22 carried by a plunger 23 operated from any suitable source of power through a plunger rod 24.

When fibrous material which does not flow readily is compressed in apparatus such as illustrated, the friction of the material against the sides of the mold tends to increase the resistance of the material due to movement by the edges of the plunger. This tends to increase the density of the material in the compressed article where the edges of the plunger meet the side walls of the mold, as indicated at 25 on Fig. 4. Conversely the friction of the material on the side walls reduces the effective pressure on the material at the lower outer corners of the article as indicated at 26 in Fig. 4. For many purposes this discrepancy between the density of the material at the upper outer corners and at the lower outer corners is not troublesome, but sometimes it is disadvantageous. Where this is true and where the finished article is desired to be quite porous, the material may be first compressed to a greater extent than is desired in the final article, as indicated in Fig. 4, and then the pressure may be partly released as indicated in Fig. 5. During this release the expansion of the material is resisted less by friction at 25 than it is at 26 so that the density of the material at these two points tends to equalize.

For illustrative purposes it is indicated that the material may be set in compressed form by means of diathermic heating. This is advantageous over heating the walls of the mold where the completed article is of material thickness, especially where it is quite porous and intended for a heat insulator. In such cases the diathermic heating results in setting the material quickly and evenly throughout, whereas the heating of the material by hot mold walls would be relatively slow and uneven. However, where there is sufficient porosity, hot air or gases may be blown through the material to produce the necessary heating. Therefore, while the diathermic heating is preferable for some purposes the method is not necessarily confined to diathermic heating.

While the method of mixing illustrated in Figures 1 and 2 is very effective and satisfactory, somewhat similar results may be obtained by other mixing methods. In Fig. 6 there is illustrated apparatus including an inclined platform or chute 30 along which there may be slid a continuous stream 31 of fibrous material. At the lower end of the chute there is a cylinder 32 provided with teeth 33. The rotation of this cylinder causes the teeth to pick up the fibrous material and throw it onto a belt 34 which is continuously moving over drums 35 and 36. An upper belt 37 moving over drums 38 and 39 gradually compresses the material onto belt 34. Supports 41 and 42 may be provided for belts 34 and 37 so that they are driven in exactly predetermined paths. Also, these supporting members 41 and 42 may be provided with any desired heating means or with provision for blowing hot air or gases through the material so as to set the bonding material to the desired extent while it is between the belts. There is thus produced a continuous sheet 43 of the compressed and at least partially set material which is discharged onto any suitable support indicated at 44. If not completely cured when discharged, it may be treated subsequently to complete the curing, as by carrying off belts 45.

The fluffing operation may be repeated, if desired, and the material sliding down chute 30 may have been previously fluffed to some extent, and it may have had the bonding powder mixed in, or the powder may be fed onto the sheet of loose material from a hopper 46 or the like.

While asbestos has been mentioned in the description of the apparatus, it will be understood that other equivalent fibers may be employed if desired, and while for obvious reasons a product of high heat resistance is preferably made from mineral fibers which withstand high temperatures, it will be readily understood that for some purposes other materials may be added to the fibrous materials.

For the bonding material it is preferable to employ a powder which is dry during the mixing operation. On the other hand it is desirable to have the powder contain a sufficient amount of a phosphoric acid radical to make it acidic, and to have a powder which either by decomposition at higher temperatures or by melting or losing water of crystallization becomes reactive when heated.

For example, zinc dihydrogen phosphate begins to melt at 140° F. and remains in a soft condition through a considerable temperature range. At 400° F. it is again solid, but somewhat tacky. While thus softened the phosphate is quite readily reactive with various materials and will react with asbestos sufficiently to form a bond. Preferably, however, additional oxide is provided as will be more fully described below.

Sodium dihydrogen phosphate with one molecule of water of crystallization does not soften until a temperature of 260° F. is reached and is again a white solid at 400° F., thus having a narrower temperature range within which it is active than the zinc dihydrogen phosphate. With two molecules of water of crystallization it melts at about 140° F.

Ammonium dihydrogen phosphate requires a still higher temperature to make it reactive, since it starts to melt at about 360° F.

Phosphate powders which undergo no change during heating have not been found suitable for bonding use. For example, potassium dihydrogen phosphate and manganese dihydrogen phosphate do not go through any reactive stage when heated to at least as high as 400° F. and do not form any appreciable bond when employed in the process described herein.

Because of the relatively wide range within which zinc dihydrogen phosphate is effective for bonding purposes and because of its ready availability, it is a desirable material. However, as obtained it frequently has some excess acid, and it readily becomes undesirably tacky under conditions frequently encountered. Also, it is highly desirable, for the most even distribution of the bonding material and its consequent efficient utilization, to have the material in a very fine powder. It is difficult to grind zinc dihydrogen phosphate to fine powder without creating pressure and heat which produces caking.

It has been found that these difficulties can be overcome by mixing the relatively coarse zinc dihydrogen phosphate with a somewhat reactive oxide, such as magnesium oxide for example. If the magnesium oxide in very fine powdered form is mixed with the zinc dihydrogen phosphate, it reacts with any excess acid, and coats the particles of phosphate. The coating on the particles forms a protective layer so that the material thus prepared may be ground to a very fine powder, while the zinc phosphate retains to some extent its acid nature. When this finely ground powder is mixed with asbestos fiber or the like and compressed and heated, there is a reaction which results in a firm bond.

Thermo-setting inorganic material suitable for bonding asbestos or the like include those which set by a chemical action when heated, either because of being rendered more active chemically by the heat or by driving off a volatile portion of a salt or water of crystallization from a salt that softens and becomes reactive and/or rehardens upon losing water. It does not include materials like hydraulic cements which set by combination with water, and usually the reactions take place with little or no water present except water of crystallization, which is driven off rather than being acquired during the setting.

The preferred bonding material includes material acidified with some phosphorus acid and material, usually oxide, with which the acid will react under heat and pressure to form an oxyphosphate bond.

Having described the general nature of the material used and the way they are mixed and formed, several definite examples of particular mixtures and treatments will be given.

*Example 1*

Equal parts by weight of long fiber asbestos and finely powdered calcium carbonate were thoroughly mixed in the manner shown in Figs. 1 and 2. There was then added to 40 parts of the mixture 9 parts by weight of 85% phosphoric acid, the acid being added by spraying. There was some immediate action, and the mixture appeared to be substantially dry. However, when compressed and heated, it formed a well-bonded cake.

Where acid is used, it is preferable to employ acid containing little water, since water driven off during pressing and heating is troublesome, especially if it is desirable to produce a dense product. Where the product is to be quite porous, water may be present without a great disadvantage. However, the mixing by the methods mentioned is especially successful with dry or nearly dry materials, and it is preferable to avoid the necessity for drying out during or after molding.

*Example 2*

35 grams of long fiber asbestos were mixed by blowing with 20 grams of fine zinc dihydrogen phosphate and 10 grams of ferric oxide. The mixture was compressed into a disc five inches in diameter and one inch thick, and heated for one-half hour at 300° F. The product was a well-cured, strong, light-weight and porous disc, constituting excellent heat insulating material.

*Example 3*

35 grams of light brown asbestos were mixed by blowing with 20 grams of pulverized zinc dihydrogen phosphate, then pressed into a disc, as in Example 2, and heated for half an hour at 375° F. This product was also well bonded, showing that there was enough reactive material in the asbestos, without additional oxide, to make a bond.

*Example 4*

20 grams of zinc dihydrogen phosphate were dusted with 2 grams of fine, light magnesia powder, and ground to a fine powder. This powder was blown together with 35 grams of brown, long fiber asbestos. The whole mixture was compressed into a disc 5 inches in diameter and ¾ inch thick and heated at 400° F. for 23 minutes. A strong, light-weight disc entirely free from tackiness was obtained.

The addition of the magnesia greatly facilitated the grinding of the zinc phosphate, so that a fine, dry, phosphate powder was produced that mixed very readily by blowing with the asbestos and produced a very uniform product.

Where a substantially neutral surface is desired to receive paint or for other reasons, the amount of magnesia may be so proportioned that substantially all of the phosphoric acid is neutralized without an appreciable excess of magnesia. There is some reaction between the magnesia and surfaces of phosphate particles during the mixing and grinding operations, but the reaction is completed only when heat is applied.

*Example 5*

Long fiber asbestos was treated first with hydrochloric acid and then with sulphuric acid to remove coloring impurities and oxides soluble in those acids. The purified product was then mixed with powdered zinc dihydrogen phosphate and pressed and heated for 24 minutes at 434° F. There was a reaction bonding the material, and the product showed no change from soaking in water for many days. The phosphate therefore forms a bond with the pure asbestos fiber.

*Example 6*

Zinc dihydrogen phosphate was mixed and ground with magnesia, as in Example 4, but using 22 parts of magnesia to 75 parts of phosphate, or approximately three times as much magnesia in proportion to phosphate as in Example 4, with very similar results, the variation in the proportion of magnesia having little effect either in the powdering of the phosphate or the setting of the product.

Articles produced as described above have a wide variety of forms and uses, the proportion of binder, manner of mixing and molding, degree of heat and pressure during molding as well as selection of fiber and binder being adapted to the purpose for which the article is intended. When properly prepared, the material may be used for sound proofing. Due to its high porosity, low conductivity, resistance to heat and to water or steam, the material is admirably suited for making self-sustaining sheets or blocks for insulating steam pipes or for other heat insulation. When sufficiently pressed, it may be used for shingles, wall board, tiling or many other purposes.

When desired, a relatively thin layer may be highly compressed and set sufficiently to hold its shape, and then a layer of mixed fiber and powder may be pressed against the thin, hard layer, in the same mold, if desired, to form a relatively porous backing. The relatively dense character of the surface may be produced in part or in whole by a relatively high amount of binder, instead of wholly by a difference in pressure. When the material is employed for heat insulation, it may be given a surface layer of aluminum foil or other highly reflective material which tends to reflect and thereby reduces still further the transmission of heat through the insulator.

The surface of a sheet or article produced in any of the ways mentioned may be painted or otherwise coated in any desired manner. Also, products of this kind may be metal surfaced on one or both sides, if desired, and employed for heat-resistant gaskets or the like. Other suitable uses for the material will be evident from the qualities which it inherently possesses, or may be made to possess by suitable selection of the fiber and phosphate binder and other ingredients.

For some purposes, it is desirable to form the material initially in flat sheets or other standard forms, and cure them only sufficiently to hold their shape during handling, and then subsequently shape the pieces to final form under heat sufficient to render the material pliable, and cure the shaped article more fully.

Various oxides may be added, if desired, to give the desired color to the products. If a colored oxide is employed, it can be utilized as an indicator of the uniformity of the mixing. When the colored oxide is distributed so uniformly that the tint is even throughout, the other ingredients will also be fairly uniformly mixed. When using an impure asbestos which is not pure white, its color can be masked and a white product will result from the addition of white powder, such as whiting or white alumina.

The degree of compression may be varied to give as light or heavy a material as desired. While in certain of the examples 55 to 65 grams of material are pressed into discs 5 inches in diameter and about one-inch thick, much lighter objects have been made, and on the other hand an exertion of pressure of a ton to the square inch has compressed a similar amount of material into a sheet $\frac{1}{8}$ inch in thickness. Therefore, the process permits a very wide range in the degree of compression, while forming a substantially uniform bonding of the fibers to hold them in their relative positions, and as indicated above, an article can be given a hard, highly compressed surface layer, for decorative or other purposes, while there may be an inner porous layer.

The cured sheets are not injured by wetting. In fact, in many instances the surface is somewhat hardened by wetting and drying, and that treatment may be used at times when an especially hard surface is desired.

What I claim is:

1. The method of producing a bonding powder which comprises first dusting granular zinc dihydrogen phosphate with finely powdered magnesia and then grinding the mixture.

2. A bonding material consisting of zinc dihydrogen phosphate and magnesia ground to a fine powder.

JOHN S. THOMPSON.

REFERENCES CITED

The following references are of record in the file of this patent:

UNITED STATES PATENTS

| Number | Name | Date |
|---|---|---|
| 1,161,989 | Skinner | Nov. 30, 1915 |
| 1,438,966 | Perry | Dec. 19, 1922 |
| 1,953,704 | Erdmann | Apr. 3, 1934 |
| 1,962,577 | Walochow et al. | June 12, 1934 |
| 2,230,880 | Brown | Feb. 4, 1941 |
| 2,235,176 | Schless | May 18, 1941 |
| 2,341,617 | Hull | Feb. 15, 1944 |
| 2,377,484 | Elmendorf | June 5, 1945 |

FOREIGN PATENTS

| Number | Country | Date |
|---|---|---|
| 233,907 | Great Britain | of 1925 |
| 326,825 | Great Britain | of 1929 |

OTHER REFERENCES

"Modern Plastics," May 1943, pages 83–85.